United States Patent
Stall

[11] Patent Number: 5,897,432
[45] Date of Patent: Apr. 27, 1999

[54] SHIRRED FOOD CASING END SYSTEM

[75] Inventor: Alan David Stall, Naperville, Ill.

[73] Assignee: Alfacel s.a., Madrid, Spain

[21] Appl. No.: 08/731,295

[22] Filed: Oct. 15, 1996

[51] Int. Cl.[6] .................................................. A22C 13/00
[52] U.S. Cl. .............................................. 452/21; 452/22
[58] Field of Search .................................. 452/21, 22, 23; 426/105, 513

[56] References Cited

U.S. PATENT DOCUMENTS

| | | |
|---|---|---|
| 604,206 | 6/1898 | Cross et al. . |
| 1,036,282 | 8/1912 | Lilienfeld . |
| 1,070,776 | 8/1913 | Cohoe et al. . |
| 1,158,400 | 10/1915 | Cohoe . |
| 1,163,740 | 12/1915 | Cohoe . |
| 1,601,686 | 9/1926 | Henderson . |
| 1,612,508 | 12/1926 | Henderson et al. . |
| 1,645,050 | 10/1927 | Henderson . |
| 1,654,253 | 12/1927 | Henderson . |
| 2,001,461 | 5/1935 | Hewitt . |
| 2,010,626 | 8/1935 | Dietrich . |
| 2,042,227 | 5/1936 | Hansel ........................ 99/175 |
| 2,103,258 | 12/1937 | Hensel ........................ 99/175 |
| 2,114,077 | 4/1938 | Hensel . |
| 2,493,063 | 1/1950 | Frank et al. ................. 99/176 |
| 2,583,654 | 1/1952 | Korsgaard . |
| 2,670,294 | 2/1954 | Frank ........................... 99/176 |
| 2,722,714 | 11/1955 | Blizzard et al. . |
| 2,983,949 | 5/1961 | Matecki . |
| 2,999,756 | 9/1961 | Shiner et al. ................. 99/176 |
| 2,999,757 | 9/1961 | Shiner et al. ................. 99/176 |
| 3,064,803 | 11/1962 | Eichin et al. ................. 206/65 |
| 3,110,058 | 11/1963 | Marbach . |
| 3,162,893 | 12/1964 | Townsend . |
| 3,274,005 | 9/1966 | Alsys ............................ 99/176 |
| 3,383,222 | 5/1968 | Alsys et al. .................. 99/176 |
| 3,397,069 | 8/1968 | Urbutis ......................... 99/176 |
| 3,401,042 | 9/1968 | Frederick et al. ............ 99/176 |
| 3,419,401 | 12/1968 | Matecki ........................ 99/176 |
| 3,427,170 | 2/1969 | Schroeder .................... 99/176 |
| 3,454,982 | 7/1969 | Arnold . |
| 3,483,801 | 12/1969 | Kupcikevicius .............. 93/8 |
| 3,550,191 | 12/1970 | Matecki . |
| 3,554,339 | 1/1971 | Richardson .................. 192/20 |
| 3,564,647 | 2/1971 | Matecki . |
| 3,570,045 | 3/1971 | Matecki . |
| 3,835,113 | 9/1974 | Burke et al. ................. 260/216 |
| 3,865,954 | 2/1975 | Tums et al. .................. 426/140 |
| 3,882,252 | 5/1975 | Winkler ....................... 426/140 |
| 3,898,348 | 8/1975 | Chiu et al. ................... 426/413 |
| 3,914,447 | 10/1975 | Tums et al. .................. 426/390 |
| 3,942,568 | 3/1976 | Stemmler ..................... 150/1 |
| 3,942,569 | 3/1976 | Becker et al. ................ 150/1 |
| 3,965,537 | 6/1976 | Ross et al. . |
| 3,971,301 | 7/1976 | McNeill et al. .............. 53/21 |
| 4,070,729 | 1/1978 | Tums et al. . |
| 4,307,488 | 12/1981 | Lofland et al. . |
| 4,411,048 | 10/1983 | Green . |
| 4,428,402 | 1/1984 | Kubo et al. .................. 138/118.1 |
| 4,475,895 | 10/1984 | Martinkek .................... 493/259 |
| 4,500,574 | 2/1985 | Hanlon ......................... 428/35 |
| 4,525,984 | 7/1985 | Kollross ....................... 53/483 |
| 4,536,175 | 8/1985 | Arnold ......................... 493/308 |
| 4,551,370 | 11/1985 | Nausedas ..................... 428/36 |
| 4,590,107 | 5/1986 | Bridgeford ................... 428/36 |
| 4,594,274 | 6/1986 | De Jong et al. .............. 428/36 |
| 4,604,085 | 8/1986 | Martinek ...................... 493/259 |

(List continued on next page.)

FOREIGN PATENT DOCUMENTS

| | | |
|---|---|---|
| 3405445 | 5/1985 | Germany . |
| 526460 | 10/1983 | Spain . |

*Primary Examiner*—Willis Little
*Attorney, Agent, or Firm*—Marshall, O'Toole, Gerstein, Murray & Borun

[57] ABSTRACT

A method for forming a vented end closure in a shirred food casing stick by forming an unshirred tail on the food casing stick, inserting a rod through the tail and into the stick, plunging the tail into the stick, and tamping the tail to form a closed end with a vent defined by the shape of the rod. A tamping rod may be used to pierce a tab on the opposite end of the food casing stock. Once pierced the tab can be ripped off the stick to leave a shard-free open end.

26 Claims, 3 Drawing Sheets

U.S. PATENT DOCUMENTS

| | | | |
|---|---|---|---|
| 4,624,873 | 11/1986 | De Jong et al. | 428/36 |
| 4,674,153 | 6/1987 | Nausedas . | |
| 4,693,280 | 9/1987 | Beardsley | 138/118.1 |
| 4,752,486 | 6/1988 | Niedenthal et al. | 426/118 |
| 4,756,057 | 7/1988 | McAllister . | |
| 4,759,100 | 7/1988 | Beardsley . | |
| 4,764,031 | 8/1988 | Hutschenreuter et al. | 383/120 |
| 4,778,639 | 10/1988 | Jon et al. | 264/190 |
| 4,792,047 | 12/1988 | Wood et al. | 264/138 |
| 4,873,748 | 10/1989 | Evyan et al. . | |
| 4,885,821 | 12/1989 | Farkonas . | |
| 4,969,233 | 11/1990 | Stanley | 452/30 |
| 5,088,956 | 2/1992 | Kollross | 452/32 |
| 5,131,883 | 7/1992 | Hendricks et al. | 452/21 |
| 5,145,449 | 9/1992 | Kazaitis et al. | 452/29 |
| 5,173,074 | 12/1992 | Farkonas et al. | 452/29 |
| 5,230,651 | 7/1993 | Farkonas et al. | 452/29 |
| 5,283,443 | 2/1994 | Norton-Wayne et al. | 250/572 |
| 5,358,765 | 10/1994 | Markulin | 428/34.8 |
| 5,407,382 | 4/1995 | Martinek | 452/29 |
| 5,445,560 | 8/1995 | Meeker et al. | 452/39 |
| 5,456,331 | 10/1995 | Gustin et al. | 180/9.1 |

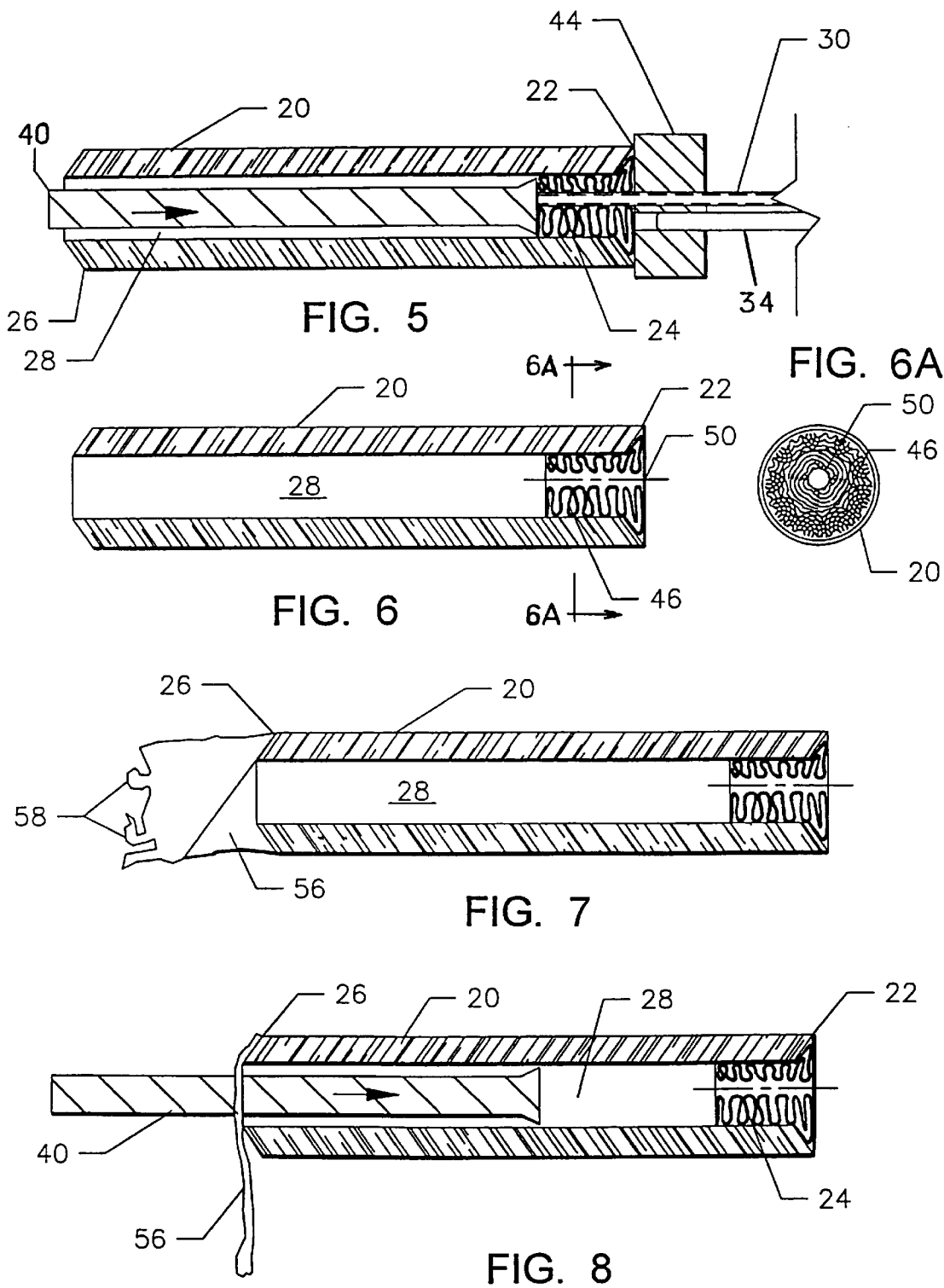

FIG. 9
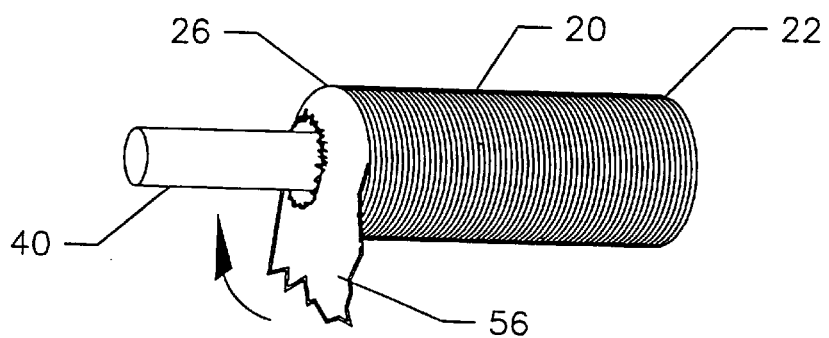
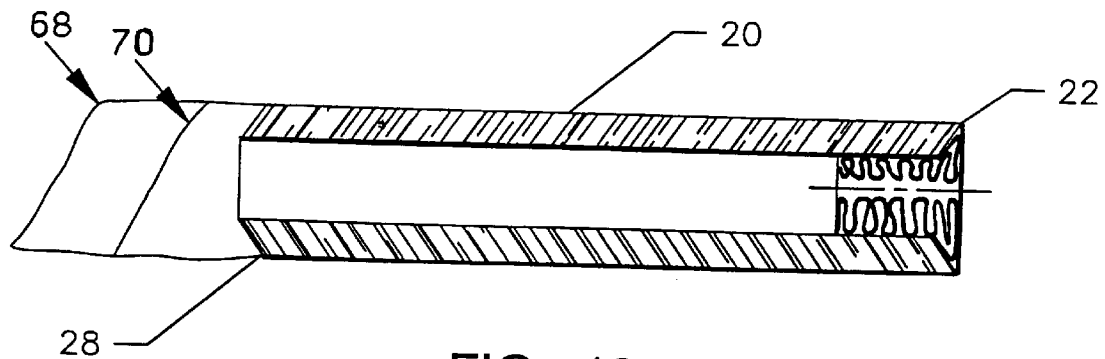
FIG. 10

5,897,432

SHIRRED FOOD CASING END SYSTEM

FIELD AND BACKGROUND OF THE INVENTION

This invention relates to provision of a new improved means of providing an end closure for cellulose casing, normally referred to as skinless sausage casing, while coincidentally adjusting the stick open end to be free of shards, burrs, etc.

Tubular cellulosic casing is well known, and has been widely used for many years by numerous manufacturers. The basic process for manufacturing regenerated cellulosic casings is through the wellknown viscose process, which creates a liquefied colloidal dispersion of cellulose fibers in a alkaline liquid carrier. Viscose is described in English Patent 8700 to Cross, et al. and in U.S. Pat. No. 1,036,282 to Lilienfield. U.S. Pat. Nos. 1,070,776; 1,158,400; and 1,163,740 to Cohoe and Fox describe the use of viscose to manufacture a tubular cellulosic casing. Henderson provides basic technology to manufacture viscose into tubular casings with regenerating baths touching the inner and outer surfaces of the tube in U.S. Pat. Nos. 1,601,686; 1,612,508; 1,645,050; and 1,654,253.

Very specific details for manufacturing modern-day casings from viscose into regenerated cellulose are disclosed in U.S. Pat. Nos. 2,999,756 and 2,999,757 to Shiner; U.S. Pat. No. 3,835,113 to Burke; U.S. Pat. No. 4,590,107 to Bridgeford; U.S. Pat. No. 4,778,639 to Jon; and U.S. Pat. No. 5,358,765 to Markulin. These patents describe extruding viscose (sodium cellulose xanthate, sodium hydroxide, and water) through an annular die, into a coagulating and regenerating bath, to produce a regenerated cellulosic tubular casing.

The artificial sausage casing is conventionally shirred, a process in which long tubular lengths of casing are compacted to provide shorter, coherent (straight and rigid) tubes. This is difficult to achieve, considering the shirring operation includes moisturizing and the addition of oil. The shirring operation is illustrated in U.S. Pat. Nos. 2,001,461; 2,010,626; 2,583,654; 2,722,714; 2,983,949; 3,110,058; 3,397,069; 3,454,982; and 3,898,348. Further, the casing has a thickness of 20 to 40 microns and can be easily damaged.

Small diameter shirred food casings must be end closed on one side to be used on commercial stuffing machines, such as those sold by Townsend Engineering under model names such as RT7, RT8, or sold by Handtmann under the tradename PAL. These machines require an end closure to be applied to one end of the casing so that the casing itself provides the closing means.

The stuffing operation will handle shirred sticks typically from 265 mm in length to 546 mm in length, which expand to form casing from 16.5 meters up to, and in excess of, 69 meters in length. Thus, one shirred stick could provide in excess of 500 frankfurters.

End closures must satisfy many criteria:

they must provide a means to stop leakage of meat emulsion at the start of the "stuffing" operation (filling a casing with meat emulsion);

they must be able to be "milked" out easily, so all meat in the end closure portion which is not up to full casing diameter can be collected and returned for reuse;

the end closure must be easily dislodged by the stuffing horn at the start of stuffing, but must not leak or tear in any manner; and the end closure should unshirr (expand longitudinally) and fill with paste without leaking, yet not leave too much unused casing, nor be soft, or too long in length such that excessive meat must be milked out.

As well, the other end of the stick, also referred to as the "open end," since it is always without an end closure, must be free, clean, and without any burrs, shards, or flakes which could then be free to enter the inside of the stick, and eventually end up in the meat itself.

Many types of end closures have been proposed. Hensel proposes using metal closures in U.S. Pat. Nos. 2,042,227; 2,103,258; and 2,114,077. Frank proposes using alternate metal fasteners in U.S. Pat. Nos. 2,493,063 and 2,670,294. Eichin shows metal clips, with accordion-style pleating in U.S. Pat. No. 3,064,803. Frederick shows a riveted end closure in U.S. Pat. No. 3,401,042. A plastic coated wire end closure is shown by Schroader in U.S. Pat. No. 3,427,170. Loop hanging end closures are shown in U.S. Pat. Nos. 3,483,801 and 4,969,233.

With the advent of Townsend Engineering stuffing machines, end closures could not use metal clips. Thus, Townsend shows an end closure device in U.S. Pat. No. 3,162,893 that basically twists the end of the shirred stick to create a twisted end, offering some resistance to meat flow.

Alsys in U.S. Pat. No. 3,274,005 discloses an end closure where an arbor reaches into the casing, and pulls a piece of casing back into the casing bore, while twisting it first externally outside the stick, and the completion of the twist inside the stick wall.

Alsys also shows in U.S. Pat. No. 3,383,222 an end closure, commonly referred to as the Push-Pack closure in the industry, where some of the casing is deshirred from the stick to create a "tail" that is then inverted as it is plunged back into the stick bore. Finally, a plug is tamped by a tamping rod into the stick bore from the opposite direction of the plunge to create a tamped plug. The Push-Pak closure remains very popular today, and varieties of its use represent over 75% of the commercial skinless casings used. The key is inverting the casing which increases the time the casing requires to fully unfurl during stuffing, giving excellent ability to vary the casing length in the closure, to vary the compaction, and to allow more or less resistance time to suit various machinery and meat emulsions.

Matecki provides an end closure in U.S. Pat. No. 3,419,401; 3,550,191; 3,564,647; and 3,570,045 where a portion of the shirred stick is pushed into the stick bore by a staker hook. The casing is not deshirred, and is obviously not inverted. This end closure is vented, which provides time for humidification of the shirred sticks in their package using moist steam. The Matecki end closure plug is not solid.

Tums provided an end closure in U.S. Pat. Nos. 3,865,954; 3,914,447; and 4,070,729 where the shirred casing stick is twisted and inverted into the stick inner bore to create a vented end closure, but the casing was not deshirred. Winkler shows in U.S. Pat. No. 3,882,252 various methods to twist the shirred stick wall to create a twisted and compressed end closure that is not inverted. Sheridan addresses the need to reduce the adhesion of the end closure plug with the stick bore and performs an end closure operation similar to Alsys U.S. Pat. No. 3,383,222, but Sheridan compresses the plug inside a hollow tube inserted into the stick bore. Thus, when the hollow tube is removed, the plug floats somewhat inside the bore and there is reduced force required to dislodge the plug upon stuffing.

Stemmler shows in U.S. Pat. No. 3,942,568 an end closure where the casing is deshirred, and the deshirred portion is wrapped into a coil and inserted into the stick bore in a U shape. Becker, in U.S. Pat. Nos. 3,942,569 and 3,971,301, deshirrs casing and then leaves some casing shirred in the end closure region, with this still-shirred casing being compacted into a plug and inserted into the stick bore.

Heat sealed end closures for collagen casing are illustrated, for example in Ross, U.S. Pat. No. 3,965,537; Niedenthal in U.S. Pat. No. 4,752,486; and Wood in U.S. Pat. No. 4,792,047. Greene, U.S. Pat. No. 4,411,048, shows an end closure which has casing twisted and deshirred simultaneously. The twisted knot is pushed into the stick bore while not inverted, and then the twisted portion is tamped into an inverted condition using a tamping rod entering the stick from the "aft" or "open end". Kubo in U.S. Pat. No. 4,428,402 shows an inverted twisted end closure, using no tamping or plug compression.

Martinek in U.S. Pat. Nos. 4,475,895 and 4,604,085 shows a transporting device that removes a shirred casing from a mandrel ("doffing") and then transports it into a device for the performance of end closing. Hanlon in U.S. Pat. No. 4,500,574 adds an adhesive coating onto the casing to close it. Kollross in U.S. Pat. Nos. 4,525,984 and 5,088,956 provides an externally twisted end closure, which is plunged into the stock bore.

Arnold in U.S. Pat. No. 4,536,175 provides a conical twisted plug end closure, vented, inverted, and not tamped or compacted. The amount of casing provided is constant and does not depend on the turns of the twisting arbor. The winding is done inside the bore, not externally, and is done on deshirred inverted casing, and winding the twist is done in the inverted state.

Nausedas in U.S. Pat. No. 4,551,370 provides an end closure, Alsys-style (U.S. Pat. No. 3,383,222) where the end closure plug is implanted into the stick bore. A vacuum plunge rod is inserted from the "aft", "open" end which is used to gather the casing together, and the vacuum is held while the plunge rod withdraws creating an inversion of the casing. The casing is then tamped into a plug. Nausedas also shows in U.S. Pat. No. 4,674,153 a method to make the Alsys-style end closure, of U.S. Pat. No. 3,383,222 where the plug created can be implanted into the stick bore, not always being located at the extreme "fore" or "closed" end.

Beardsley recognized the need to reduce forces required to dislodge the plugs when using an Alsys (3,383,222) end closure system. In U.S. Pat. No. 4,693,280 and 4,759,100, an Alsys-style end closure is made using a vacuum during plunging to remove the casing from the bore of the shirred stick. Beardsley kept the plug "soft" so it unfurled easily and did not damage the stuffing machine. The plug was not firmly fixed to the stick bore, yet was restrained enough to contain the stuffing pressures. Beardley also provides a system in U.S. Pat. No. 5,283,443, where an Alsys-style end closure like U.S. Pat. No. 3,383,222 is made, without a vacuum plunge, but rather with a tamping rod that is not flat. Part of the tamping rod inserts itself between the compressed plug and the stick bore, reducing plug contact with the stick, and thereby reduced friction and coincident deplug force.

Hutschenreuter et al. in U.S. Pat. No. 4,764,031 provides an end closure where the plug is a ruffled portion of the casing sitting inside an inverted casing tail. An alternate embodiment is a coiled plug similar to Stemmler, U.S. Pat. No. 3,942,568. Hendriks in U.S. Pat. No. 5,131,883 provides an end closure which is twisted inside the stick bore. The twist begins not at the end of the stick, but rather down several pleats from the end. Thus, the twisted knot feeds from both ends of the stick.

Meeker in U.S. Pat. No. 5,445,560 shows a hybrid end closure. Meeker explains advantages of vents in arbor closures (twisted plug) to allow gas to escape. But, arbor closures traditionally have a disadvantage of having too low a resistance against blow-out. Meeker mentions problems in stripping meat out of end closures which have a compressed plug. Meeker offers an end closure which is vented by radially twisting some casing while the twisting device is in contact with the tamp rod, and then providing a plug which encompasses the radially twisted portion to anchor it to the stick bore.

Madrigal, U.S. Pat. No. 5,456,331, provides an end closure where the casing is externally twisted and then plunged into the stick bore. Twisting is finished while the twist rod contacts a tamp cylinder. The twist rod is then withdrawn and the plug is compressed. The resulting end closure is vented and retains the shape of the arbor as the vent.

Other twisted end closure patents include Spanish Pat. No. 526,460 to Fernandez de Retana (also German Pat. No. DE 3,405,445 A1), where the stick wall is grabbed and twisted into a knot.

The prior art also refers to methods to retain a clean open end of the shirred stick. The open end must be free of shards or flakes which can catch on the stuffing horn. The open end must present a round bore with no casing covering it (casing covering the bore is referred to as a "tab"). It has been customary for many years to manually rip a short piece of casing off the open end and spiral the piece slightly to create a "detabbed" or clean appearance open end although it is desirable to automate this procedure.

Majewski, U.S. Pat. No. 3,544,339, describes the need for a clean open end by using an adhesive wax stiffening agent applied to the casing at the open end, to retain integrity. Lofland, U.S. 4,307,488, uses a rotating or oscillating shaping device to dress the open end of the shirred stick during the compression stage.

DeJong, U.S. Pat. Nos. 4,594,274 and 4,624,873, uses a heated cone to contact the stick open end and to mold the loose casing into a tight cone. Evyan, U.S. Pat. No. 4,873,748, uses a turning cone to burnish the open end and retain the casing.

U.S. Pat. Nos. 4,885,821; 5,173,074; 5,230,651 to Farkonas; U.S. Pat. No. 5,145,449 to Kazaitis; and U.S. Pat. No. 5,407,382 to Martinek all address the need for a cleaner "open end" by using better cutting techniques to provide casing cuts with shard-free cuts, again illustrating the need for better open ends.

Alsys, U.S. Pat. No. 3,383,222, discloses a casing that is recognized as a fundamental style in the manufacturing of end closures, but the prior art does not fully address the need for a good open end and a good closed end using fundamental principles. There remains inconsistent performance in end closures since many different meat emulsion compositions, stuffing machines, and emulsion temperatures place an unusual burden on the end closure.

There is a need for a system that addresses the combined needs of open ends and closed ends.

SUMMARY OF THE INVENTION

The present invention provides an improved end closure in a shirred food casing stick by: shirring a food casing into a shirred stick defining a bore therethrough and having a first end with an unshirred tail; inserting a rod through the unshirred tail and into the stick bore; plunging the unshirred tail into the shirred stick bore; tamping the unshirred tail toward the first end to close the unshirred tail around the rod; and removing the rod to define a vent in the tamped tail end.

The step of shirring the food casing may include pulling the tail at an angle from between 45 degrees and 90 degrees relative to a longitudinal axis of the stick bore.

The step of plunging the unshirred tail into the shirred stick bore may include moving the rod to a side of the stick bore.

The step of tamping the unshirred tail toward the first end may includes: positioning a backstop adjacent the first end of the casing stick; and tamping the unshirred tail against the backstop. The backstop may be resilient.

The step of tamping the unshirred tail may include rotating a tamping rod within the shirred stick. The step of removing the rod may include rotating the rod about a longitudinal axis.

In addition to providing an improved end closure, the method may provide a better open end by: forming an unshirred tab on a second end of the shirred casing stick; piercing the unshirred tab with a tamping rod; and pulling the pierced unshirred tab from the shirred casing stick to define an open end of the shirred casing stick. Forming the unshirred tab may be done by bending the tab to at least partially cover the shirred stick bore.

Another method for making improved shirred casing sticks includes: shirring a food casing into a shirred stick defining a bore therethrough, and having a first end with an unshirred tail and a second end with an unshirred tab; inserting a rod through the unshirred tail and into the shirred stick bore; plunging the unshirred tail into the shirred stick bore; piercing the unshirred tab with a tamping rod; tamping the unshirred tail toward the first end to close the unshirred tail around the rod; removing the rod from the shirred stick bore to define a vent in the tamped first end; and pulling the pierced unshirred tab from the shirred casing stick to define an open end of the shirred casing stick.

BRIEF DESCRIPTION OF THE DRAWINGS

FIG. 5 is a cross-sectional view of the food casing with a tamping rod tamping the unshirred tail against a backstop;

FIG. 6 is a cross-sectional view of the food casing with the unshirred tail tamped to form a vented end closure;

FIG. 6A is a cross-section of the food casing taken along line A—A in FIG. 6;

FIG. 7 is a partial cross-sectional view of a food casing stick having an unshirred tab;

FIG. 8 is a cross-sectional view of the FIG. 7 with a tamping rod piercing the tab and tamping the unshirred tail;

FIG. 9 is a perspective view of the shirred stick with the tab pierced by a tamping rod; and FIG. 10 is a side view of a shirred food casing stick having a substantially shard-free open end.

DETAILED DESCRIPTION OF THE DRAWINGS

Figure 1:
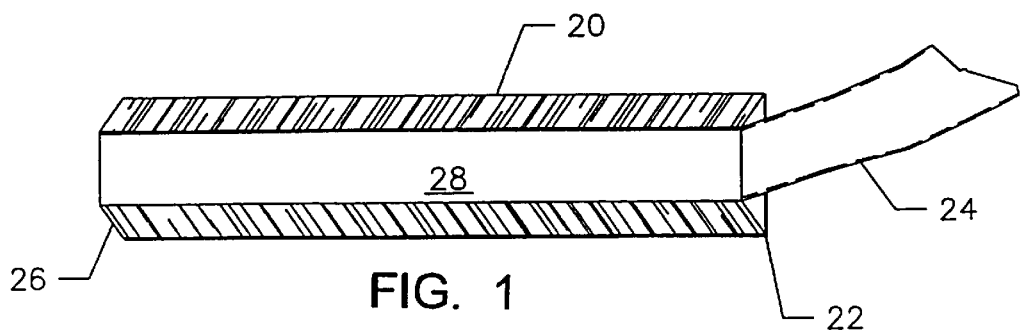
FIG. 1 is a cross-sectional view of a food casing formed with an unshirred tail in accordance with the present invention.

In the following detailed description, the same reference numerals will be used to identify the same elements in each of the figures. Illustrated in FIG. 1 is a partially shirred casing stick 20 having a first end 22 with a tail 24. The casing stick also has a second end 26 that will be open.

During the shirring operation, compression of the casing 20 is always performed. It is quite easy during compression to ensure the first end portion of the stick 20 is not coherently compressed, and a tail 24 is left. One method for obtaining such a first end tail 24 is to compress the casing into a soft, sponge-like background during the shirring operation. A more optimum method is to apply high quantities of mineral oil internally and externally at the start of the shirring cycle. The casing stick tail 24 produced at the start of shirring is also the portion of the casing which becomes the "front end" or "fore end" of the stick 20, eventually becoming the end closure.

This highly oil-saturated tail 24 will not adhere well to neighboring portions of the stick during compression. A surfactant, such as Eastman Chemicals Myvacet 9–45 or ICI Span-85, can be added to the external oil to improve slipperiness slightly and enhance this tail 24 somewhat.

When the tail 24 is thus ensured, the casing 20 can be gripped and a tail 24 pulled consistent with Alsys, U.S. Pat. No. 3,383,222. It is easier to pull the tail 24 at an angle between 45 degrees and 90 degrees from the longitudinal axis of the stick 20, to avoid deshirring more casing than necessary.

Figure 2:
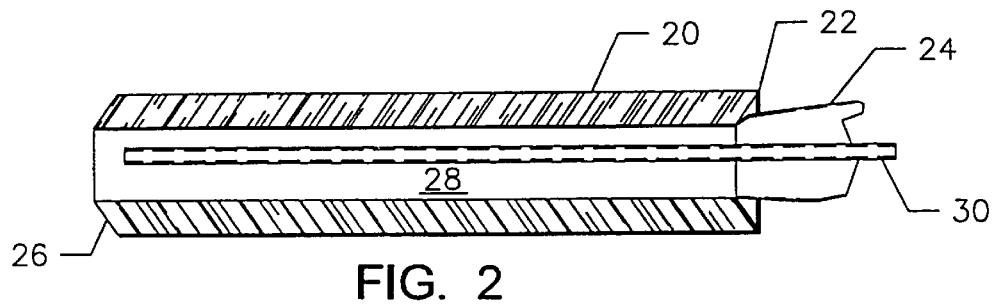
FIG. 2. is a cross-sectional view of a food casing having a bore in which a rod is inserted.

In FIG. 2, the tail 24 is straightened longitudinally, and a hollow plastic rod 30 is inserted through the stick bore 28. The rod 30 can be solid or hollow, but hollow is preferred because it permits gas to escape as the tail 24 is compressed, as described below.

Figure 3:
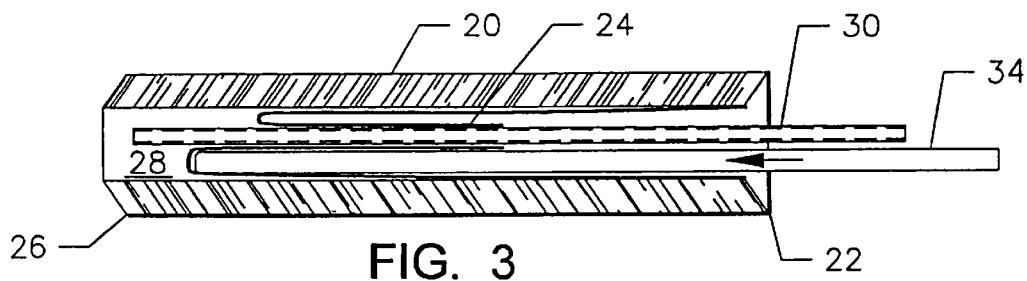
FIG. 3 is a cross-sectional view of the food casing with the unshirred tail plunged into the food casing bore.

In FIG. 3, a plunge rod 34 plunges with the plastic rod 30 still in place. The plastic rod 30 is forced to the edge of the bore 28.

Figure 4:
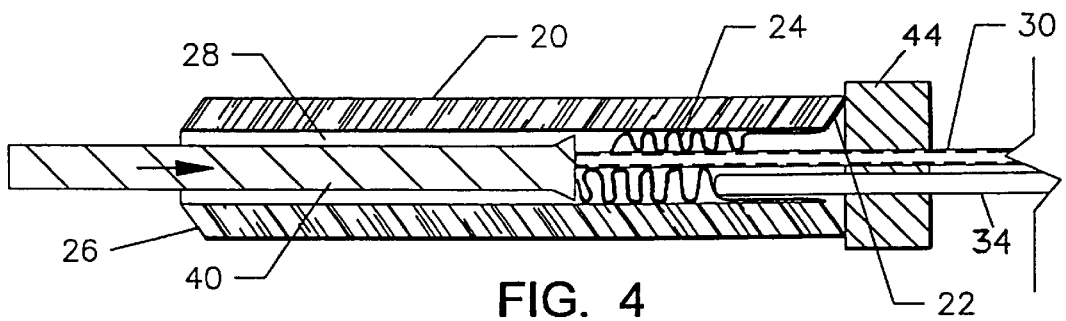
FIG. 4 is a cross-sectional view of the food casing with a tamping rod inserted into the bore.

In FIG. 4, the plunge rod 34 has been retracted. A tamp rod 40 is inserted into the bore 28 and forces the tail 24 to the right. Any gases that are in the bore 28 can escape through the hollow rod 30. The tamp rod 40 also pushes the plastic rod 30 out of the bore 28.

In FIG. 5, tamping continues against a backstop 44. The backstop is typically nylon with a soft rubber or sponge cover to allow the plug to tamp freely, and even extend slightly past the stick proper.

In FIG. 6, the tamping is completed and a plug 46 remains within the bore 28, however, a clear vent hole 50 (FIG. 6A) has been formed in the end closure plug 46. The vent hole 50 can be round or square, big or small depending upon anticipated stuffing conditions. The size and shape of the vent hole 50 is easily adjusted by varying the rod 30 shape or size. Since the tamp rod 40 pushes the plastic rod 30 out, a vent hole 50 is always assured.

Deplug force can be reduced in the above casing 20 by rotating the plastic rod 30 and/or the plunge rod 34. Rotation of one or both of these elements winds the casing somewhat around the element, drawing it away from the stick bore 28. Given the high oil content of the end closure tail 24, this action may be needed only in extreme cases.

Another embodiment of the invention is to use the end closing device to effect an improved open end 26. It has been found that there are many variables that affect quality of open ends 26, such as moisture, diameter, humidity of casing, geometric irregularities, lack of concentricity of the casing stick bore 28 with its outer diameter. The automatic methods for cleaning up open ends are not foolproof. However, by forming a tab 56 on the second end 26 during the shirring operation a much improved open end can be made by pulling the tab 56 off of the stick to define an open end substantially free of shards, burrs, etc.

FIG. 7 shows an undesirable open end tab 56 having a poor cut, and some casing pieces, or shard fragments 58 that can be dislodged during stuffing.

Automatic systems thus must have a perfect cut of casing every stick 20, and a perfect open end 26 forming every stick 20. Defect rates in packing houses are very demanding and must be less than one defect per 1000 meters, or less than one defect per forty shirred sticks.

Since the "closed end" of one stick is physically connected to the "open end" of the previous stick prior to severing the unshirred casing between the two sticks, it has been found that when high levels of mineral oil are added to the shirred stick 20 at the closed end 22 of the casing, this also means mineral oil is heavily applied to the open end. Thus, both the open end 26 and closed end 22 have a high oil content, and it is easy to pull a tail 24 or a tab 56. The closed end tail 24 is pulled for end closing purposes. The open end tab 56, which is a very big tab, is pulled for ripping the casing 20.

The end closure tamp rod 40 pierces the open end tab 56 (FIG. 8) on its way to tamping the end closure as shown in FIGS. 4 and 5. Once the casing tab 56 has been pierced, a very simple tearing motion in either direction can be tested to determine which direction of tear will yield the best results, but a 90 degree turn in the clockwise direction when looking from the open end 26 to the closed end 22, works well. The key is to pull the tab 56 while the tamp rod 40 remains inserted in the bore 28 during its end closing operation. (See FIG. 9.)

The resulting open end 26 is absolutely shard-free upon casing deshirring, with a perfectly defined cone and no tabs. Approximately four inches of casing is lost, but representing only a 0.33% increase in loss of product. Conventional technology loss is about one stick in 200 due to open end problems, so that is 0.5% waste, higher than the loss of casing with automatic tab removal. For the customer, there is more certainty in open end 26 quality.

FIG. 10 shows the typical appearance of the cut that results from pulling the tab 56, where the cut 68 tends to follow the major pleat helix line 70 of the shirred casing 20.

Therefore, one system can provide an end closure, and facilitate improved open end quality.

The foregoing is provided for clearness of understanding only and no unnecessary limitations therefrom should be read into the following claims.

I claim:

1. A method for creating an end closure in a shirred food casing, comprising the steps of:

shirring a food casing into a shirred stick defining a bore therethrough and having a first end with an unshirred tail;

inserting a rod through the unshirred tail and into the stick bore;

plunging the unshirred tail into the shirred stick bore;

tamping the unshirred tail toward the first end to close the unshirred tail around the rod; and removing the rod to define a vent in the tamped tail.

2. The method of claim 1 in which the step of shirring the food casing includes:

pulling the tail at an angle from between 45 degrees and 90 degrees relative to a longitudinal axis of the stick bore.

3. The method of claim 1 in which the step of plunging the unshirred tail into the shirred stick bore includes:

moving the rod to a side of the stick bore.

4. The method of claim 1 in which the step of tamping the unshirred tail toward the first end includes:

positioning a backstop adjacent the first end of the casing stick and tamping the unshirred tail against the backstop.

5. The method of claim 1 in which the step of tamping the unshirred tail toward the first end includes:

positioning a resilient backstop adjacent the first end of the casing stick and tamping the unshirred tail against the resilient backstop.

6. The method of claim 1 in which the step of plunging the unshirred tail into the shirred stick bore includes:

inserting a plunger into the casing bore from the first end.

7. The method of claim 1 in which the step of tamping the unshirred tail comprises:

rotating a tamping rod within the shirred stick.

8. The method of claim 1 in which the step of removing the rod comprises:

rotating the rod about a longitudinal axis.

9. The method of claim 1 and further comprising the steps of:

forming an unshirred tab on a second end of the shirred casing stick;

piercing the unshirred tab with a tamping rod; and pulling the pierced unshirred tab from the shirred casing stick to define an open end of the shirred casing stick.

10. The method of claim 9 in which the step of forming an unshirred tab includes:

bending the tab to at least partially cover the shirred stick bore.

11. A method for producing a shirred casing stick with an end closure at a first end and an open end substantially free of shard fragments, comprising the steps of:

shirring a food casing into a shirred stick defining a bore therethrough, and having a first end with an unshirred tail and a second end with an unshirred tab;

inserting a rod through the unshirred tail and into the shirred stick bore; plunging the unshirred tail into the shirred stick bore;

piercing the unshirred tab with a tamping rod;

tamping the unshirred tail toward the first end to close the unshirred tail around the rod;

removing the rod from the shirred stick bore to define a vent in the tamped tail; and pulling the pierced unshirred tab from the shirred casing stick to define an open end of the shirred casing stick.

12. The method of claim 11 in which the step of shirring the food casing includes:

pulling the tail at an angle from between 45 degrees and 90 degrees relative to a longitudinal axis of the stick bore.

13. The method of claim 11 in which the step of plunging the unshirred tail into the shirred stick bore includes:

moving the rod to a side of the stick bore.

14. The method of claim 11 in which the step of tamping the unshirred tail toward the first end includes:

positioning a backstop adjacent the first end of the casing stick and tamping the unshirred tail against the backstop.

15. The method of claim 11 in which the step of tamping the unshirred tail toward the first end includes:

positioning a resilient backstop adjacent the first end of the casing stick and tamping the unshirred tail against the resilient backstop.

16. The method of claim 11 in which the step of plunging the unshirred tail into the stick bore includes:

inserting a plunger into the casing bore from the first end.

17. The method of claim 11 in which the step of tamping the unshirred tail comprises:

rotating a tamping rod within the shirred stick.

18. The method of claim 11 in which the step of removing the rod comprises:

rotating the rod about a longitudinal axis.

19. The method of claim 11, and further comprising the steps of:

forming an unshirred tab on a second end of the shirred casing stick;

piercing the unshirred tab with a tamping rod; and pulling the pierced unshirred tab from the shirred casing stick to define an open end of the shirred casing stick.

20. The method of claim 19 in which the step of forming an unshirred tab includes:

bending the tab to at least partially cover the shirred stick bore.

21. A method for creating an end closure in a food casing, the food casing having a first end having a tail portion, a second end, and an interconnecting bore, comprising the steps of:

inserting a rod into the bore through the first end;

plunging the tail portion into the bore;

tamping the tail portion toward the first end to close the tail portion around the rod; and removing the rod to define a vent in the tamped tail portion.

22. The method of claim 21, in which the step of plunging the tail portion into the bore includes:

moving the rod to a side of the bore.

23. The method of claim 21, in which the step of tamping the tail portion toward the first end includes:

positioning a backstop adjacent the first end and tamping the tail portion against the backstop.

24. The method of claim 21 in which the step of plunging the tail portion into the bore includes:

inserting a plunger into the bore from the first end.

25. The method of claim 21 in which the step of tamping the tail portion comprises:

rotating a tamping rod within the bore about a longitudinal axis.

26. A method for creating an end closure in a shirred food casing, the food casing having a first end including an unshirred tail portion, a second end, and an interconnecting bore, comprising the steps of:

inserting a rod into the bore through the first end;

plunging the tail portion into the bore;

tamping the tail portion toward the first end close the tail portion around the rod; and removing the rod to define a vent in the tail portion adjacent the first end.

* * * * *